United States Patent
Suryanarayana et al.

(10) Patent No.: US 11,861,349 B2
(45) Date of Patent: Jan. 2, 2024

(54) MODULAR FIRMWARE UPDATES IN AN INFORMATION HANDLING SYSTEM

(71) Applicant: Dell Products L.P., Round Rock, TX (US)

(72) Inventors: Shekar Babu Suryanarayana, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 17/450,232

(22) Filed: Oct. 7, 2021

(65) Prior Publication Data
US 2023/0112734 A1    Apr. 13, 2023

(51) Int. Cl.
G06F 9/445    (2018.01)
G06F 8/65    (2018.01)
H04L 9/32    (2006.01)

(52) U.S. Cl.
CPC .............. *G06F 8/65* (2013.01); *H04L 9/3247* (2013.01)

(58) Field of Classification Search
CPC ................................ G06F 8/65; H04L 9/3247
USPC .................................................. 717/168–178
See application file for complete search history.

(56) References Cited

U.S. PATENT DOCUMENTS

| | | | |
|---|---|---|---|
| 7,805,719 B2 * | 9/2010 | O'Neill ............... | G06F 9/30025 717/168 |
| 10,789,062 B1 * | 9/2020 | Suryanarayana ......... | G06F 8/65 |
| 2012/0005480 A1 * | 1/2012 | Batke .................... | G06F 21/572 713/175 |
| 2020/0326930 A1 * | 10/2020 | Suryanarayana ......... | G06F 8/65 |

* cited by examiner

*Primary Examiner* — Chuck O Kendall
(74) *Attorney, Agent, or Firm* — Norton Rose Fulbright US LLP

(57) ABSTRACT

A method for managing firmware of an information handling system may include receiving, by the information handling system, an update for a firmware of the information handling system. The information handling system may determine based, at least in part, on the received update, one or more firmware modules of the information handling system that are changed by the update. The information handling system may determine a location of each of the one or more firmware modules within one or more firmware volumes of the information handling system using an offset list including one or more offsets corresponding to the one or more firmware modules. The information handling system may update the one or more firmware modules based, at least in part, on the determined location of each of the one or more firmware modules within the one or more firmware volumes.

20 Claims, 12 Drawing Sheets

MODULAR FIRMWARE UPDATES IN AN INFORMATION HANDLING SYSTEM

FIELD OF THE DISCLOSURE

The present disclosure generally relates to information handling systems, and more particularly relates to modular firmware updates in information handling systems.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

With the increasing capabilities of information handling systems, firmware for running information handling systems has also become increasingly complex. Furthermore, updates to firmware of an information handling system are increasingly frequent as new vulnerabilities and flaws in firmware are discovered and/or new features are added. Such updates can create increasing amounts of downtime for information handling systems, negatively impacting a user experience. For example, updates to firmware of an information handling system may require updating entire firmware images, a time-consuming, slow, and cumbersome process during which the information handling system may be unavailable for use by the user. Some firmware updates may even require multiple reboots for installation. Furthermore, some users of information handling systems may neglect to download firmware updates, due to required information handling system downtime to apply the updates. Neglecting to install firmware updates may negatively impact a security of an information handling system, leaving the information handling system vulnerable to exploits by unauthorized parties.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may update specific firmware modules of one or more firmware volumes, rather than an entire firmware volume or image, to reduce an amount of system downtime required for application of firmware updates. An offset list of a memory, such as a system serial peripheral interface (SPI) flash memory containing one or more firmware volumes, may facilitate such updating, allowing the information handling system to determine offsets within the memory at which the firmware modules to be updated are stored. For example, the information handling system may compare a received firmware update package with data from the offset list and may identify storage locations within a memory of one or more modules that are changed by the firmware update package. After determining the firmware module locations in the memory, the information handling system may update each individual firmware module, without overwriting and/or updating an entire firmware volume or firmware image stored on the memory. Furthermore, the information handling system may communicate with a remote signature server to obtain signatures associated with the updates to the firmware modules, to maintain security of the firmware. In some embodiments, the information handling system may maintain the ability to roll back specific firmware modules, storing modular firmware updates, or modular firmware update deltas, and signatures in a memory of the information handling system to allow efficient rollback of firmware modules if needed. Modular firmware updates, as described herein, may enhance a user experience by reducing an amount of system downtime required for application of firmware updates to an information handling system. Furthermore, such firmware updates may enhance a security of the information handling system, as users may be more likely to update firmware frequently if downtime due to firmware updates is reduced.

Firmware of an information handling system may be managed using modular updates to reduce an amount of information handling system downtime required for updating the firmware. An example method for updating firmware of an information handling system may include receiving, by the information handling system, an update for a firmware of the information handling system. For example, a firmware update may be received from a third-party vendor or from a first party manufacturer for updating the firmware of the information handling system. In some embodiments, the received firmware update may be organized as a modular firmware update and may include data only for firmware modules to be updated or delta data detailing changes to the firmware. In other embodiments, the received firmware update may be a firmware update for a whole firmware image, or a whole firmware volume, of the information handling system.

After the firmware update is received, the information handling system may determine, based at least in part on the received update, one or more firmware modules of the information handling system that are changed by the update. For example, the information handling system may compare a received firmware update package with a current firmware image of the information handling system to determine one or more modules of the firmware image that differ from the contents of the received firmware update. A firmware module may, for example, be a portion of a firmware file section located within a portion of a firmware file, located within a firmware volume. In some embodiments, a firmware module may be a firmware file, or other sub-division of a firmware volume.

In some embodiments, the information handling system may generate, based on the determined one or more firmware modules and the received update, a modular firmware update package, including updates to one or more firmware modules included in the received firmware update. The modular firmware update package may, for example, include an updated signature for one or more of the updated firmware modules, or one or more firmware volumes comprising firmware modules that are to be updated. The modular firmware update package may further include an updated signature for the entire firmware image. Such updated signatures may, for example, be obtained by the information handling system from a remote signing server. In some embodiments, the information handling system may request an updated module signature for each of the one or more firmware modules, an updated firmware volume signature, and/or an updated signature for the entire firmware image from the remote signing server.

The information handling system may determine a location of each of the one or more firmware modules within one or more firmware volumes of the information handling system using an offset list offset list including one or more offsets corresponding to the one or more firmware modules. For example, the offset list may specify offsets within a memory at which each firmware modules begins. The information handling system may determine offsets specifying a location of each of the one or more firmware modules to be updated using the offset list. In some embodiments, the offset list may also specify a size of the memory allocated to each firmware module, and the information handling system may determine a size of the memory allocated to each firmware module to be updated in addition to a location at which the firmware module is stored.

The information handling system may update the one or more firmware modules based, at least in part, on the determined location of each of the one or more firmware modules within the one or more firmware volumes. For example, the information handling system may overwrite only the firmware modules that are updated, rather than overwriting an entire firmware image of the memory or an entire firmware volume of the memory. In some embodiments, the information handling system may update the firmware modules at a word level, updating only words of the firmware module that differ from words of the updated firmware received in the firmware update package. Such updating may allow the firmware to be updated without rebooting the information handling system and/or with minimum system downtime if rebooting is required to implement the firmware update.

The information handling system may determine a size of the updated firmware module and may determine whether sufficient space is allocated to the firmware module in the memory to accommodate the updated firmware module. For example, additional unused space may be allocated in the memory to the firmware module following the contents of the firmware module and before a beginning of a next firmware module. The information handling system may determine, if the updated firmware module requires more space than a current firmware module, whether additional space allocated to the firmware module is sufficient to store the additional content of the updated firmware module. If insufficient space is allocated for storing the updated firmware module in the portion of the memory allocated to the firmware module, the information handling system may store at least a portion of the updated firmware module on a different memory, such as an extended system partition on a hard drive or a solid-state drive, of the information handling system to avoid overwriting a portion of a different firmware module with the contents of the updated firmware module. If sufficient space is present for storing the updated firmware module in the portion of the memory allocated to the firmware module, the information handling system may overwrite all or a portion of the memory allocated to the firmware module with the contents of the updated firmware module, such as overwriting one or more words of the firmware module.

Updating the firmware modules may include applying an updated module signature for each of the updated firmware modules and/or applying an updated firmware volume signature to a firmware volume including one or more of the updated firmware modules. Such a signature may be received by the information handling system from a remote signing server.

In some embodiments, when building a flash layout, the information handling system may allocate to a firmware module more space than is required to store the firmware module within a memory, such as a flash SPY memory, of the information handling system. For example, space for future updates to firmware modules that may require more space than a current version of a firmware module requires may be allocated to one or more firmware modules. The information handling system may map the flash memory including the one or more firmware modules to determine a location of each of the one or more firmware modules. Such a determination may include a determination of offsets within the memory in which the firmware is stored at which each of the firmware modules begins. The information handling system may further determine an amount of reserved space allocated to each of the one or more firmware modules. Such a determination may include a determination of an amount of unused space allocated to each firmware module. The information handling system may store the determined location of each of the one or more firmware modules and the amount of reserved space for each of the one or more firmware modules in a modular offset list, for use in performing a modular firmware update.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
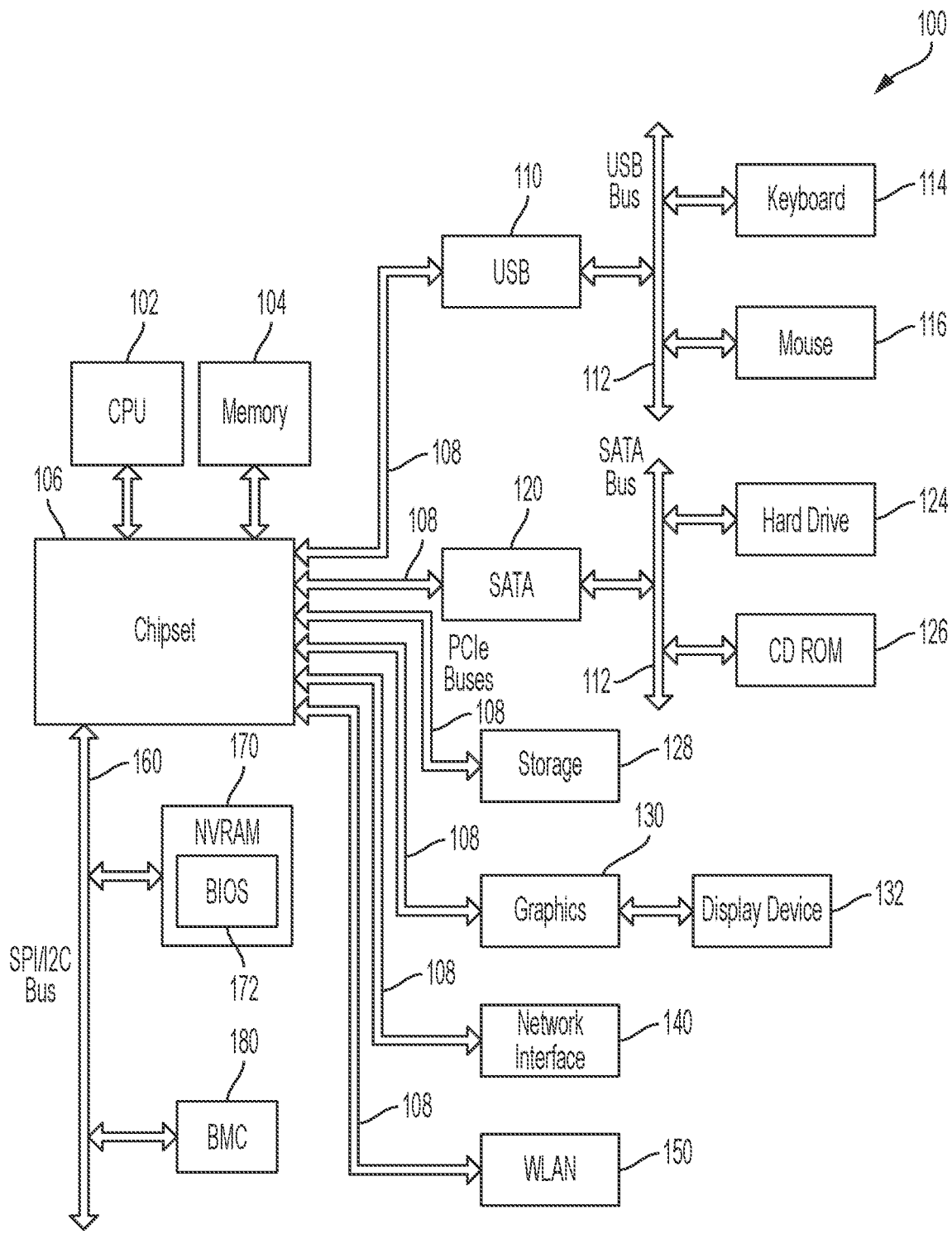
FIG. 1 is a block diagram of an example information handling system according to some embodiments of the disclosure.

FIG. 1 illustrates an example information handling system 100. Information handling system 100 may include a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In one example embodiment, chipset 106 may be directly connected to an individual end point via a PCIe root port within the chipset and a point-to-point topology as shown in FIG. 1. BMC 180 may be referred to as a service processor or embedded controller (EC). Capabilities and functions provided by BMC 180 may vary considerably based on the type of information handling system. For example, the term baseboard management system may be used to describe an embedded processor included at a server, while an embedded controller may be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system may be referred to as a storage enclosure processor or a chassis processor.

System 100 may include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 may include instructions executable by CPU 102 to initialize and test the hardware components of system 100, and to load a boot loader or an operating system (OS) from a mass storage device. BIOS 172 additionally may provide an abstraction layer for the hardware, such as a consistent way for application programs and operating systems to interact with the keyboard, display, and other input/output devices. When power is first applied to information handling system 100, the system may begin a sequence of initialization procedures, such as a BIOS boot procedure. During the initialization sequence, also referred to as a boot sequence, components of system 100 may be configured and enabled for operation, and device drivers may be installed. Device drivers may provide an interface through which other components of the system 100 can communicate with a corresponding device. BIOS, as used herein, may also refer to a unified extensible firmware interface (UEFI).

In some embodiments, one or more BIOS firmware modules to be loaded and executed by the BIOS 172 during booting of the information handling system may be stored in a memory 170 of the BIOS 172. One or more BIOS firmware modules to be loaded and executed by the BIOS 172 during booting of the information handling system 100 may also be stored in system storage 128, such as in a hard drive of the information handling system or in a solid-state drive of the information handling system. In some embodiments, such BIOS firmware modules may be stored in hard drive 124. For example, available space in the BIOS memory 170, such as in a serial peripheral interface flash memory, may be limited. To allow for a more extensive array of BIOS firmware modules to be loaded and executed by the BIOS 172, BIOS firmware modules, such as BIOS feature sets, BIOS recovery files, drivers or driver components, telemetry data, and other BIOS firmware modules, along with a host operating system, recovery operating system boot sensitive files, may be stored in an extended system partition of a hard drive or solid state drive of the information handling system accessible to the BIOS 172. File paths to the information stored in an extended system partition on a hard drive or solid-state drive of the information handling system may be hard coded into the BIOS 172 of the information handling system 100. BIOS firmware modules may, for example, include BIOS drivers and other BIOS firmware components. In some embodiments, BIOS firmware modules may include third party firmware modules, such as third-party drivers, that may be hosted and run by a BIOS, such as to collect telemetry from one or more devices, such as components of the information handling system, during booting of the information handling system.

Information handling system 100 may include additional components and additional busses, not shown for clarity. For example, system 100 may include multiple processor cores, audio devices, and the like. While a particular arrangement of bus technologies and interconnections is illustrated for the purpose of example, one of skill will appreciate that the techniques disclosed herein are applicable to other system architectures. System 100 may include multiple CPUs and redundant bus controllers. One or more components may be integrated together. For example, portions of chipset 106 can be integrated within CPU 102. Additional components of information handling system 100 may include one or more storage devices that may store machine-executable code, one or more communications ports for communicating with external devices, and various input and output (I/O) devices, such as a keyboard, a mouse, and a video display.

Figure 2:
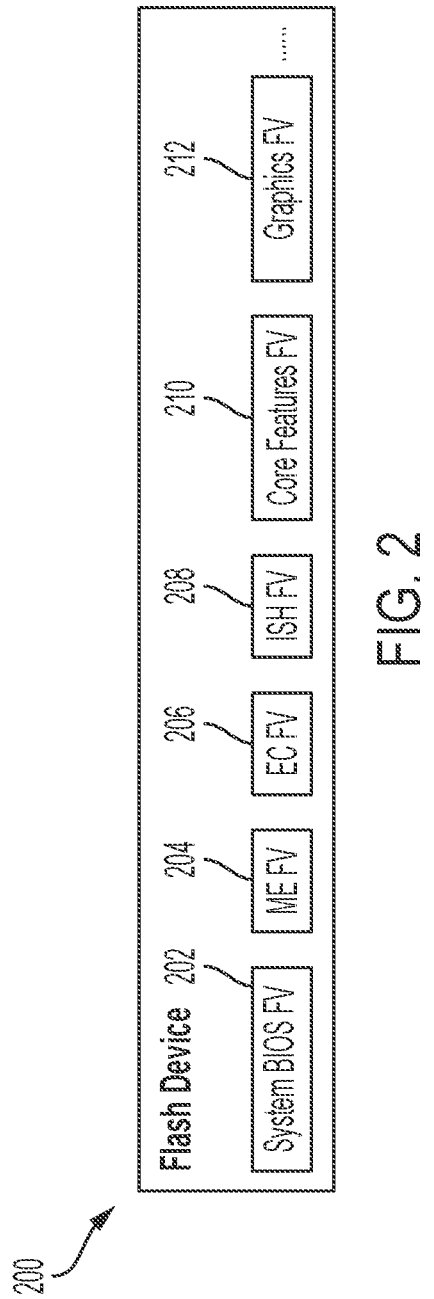
FIG. 2 is a block diagram of an example flash firmware memory according to some embodiments of the disclosure.

Firmware of an information handling system may be stored in a flash memory, such as a SPI flash memory of the information handling system. For example, NVRAM 170 of FIG. 1 may be a flash memory and may store a firmware image comprising multiple firmware volumes of the information handling system. An example flash memory 200 of an information handling system is shown in FIG. 2. The flash memory 200 may, for example, be a SPI flash memory, such as an NVRAM memory, including one or more firmware volumes. The firmware volumes stored on the flash memory may include a system BIOS firmware volume 202, a management engine (ME) firmware volume 204, an embedded controller firmware volume 206, an integrated sensor hub (ISH) firmware volume 208, a core features firmware volume 210, a graphics firmware volume 212, and other firmware volumes. The firmware volumes 202-212 stored in the flash memory 200 may be further divided into modules to allow for modular updates to be applied to each firmware volume. For example, updating a firmware volume, as opposed to one or more of the firmware volume's constituent firmware modules, may be a time-consuming process, requiring overwriting the entire firmware volume, which may lead to substantial downtime of an information handling system.

Figure 3:
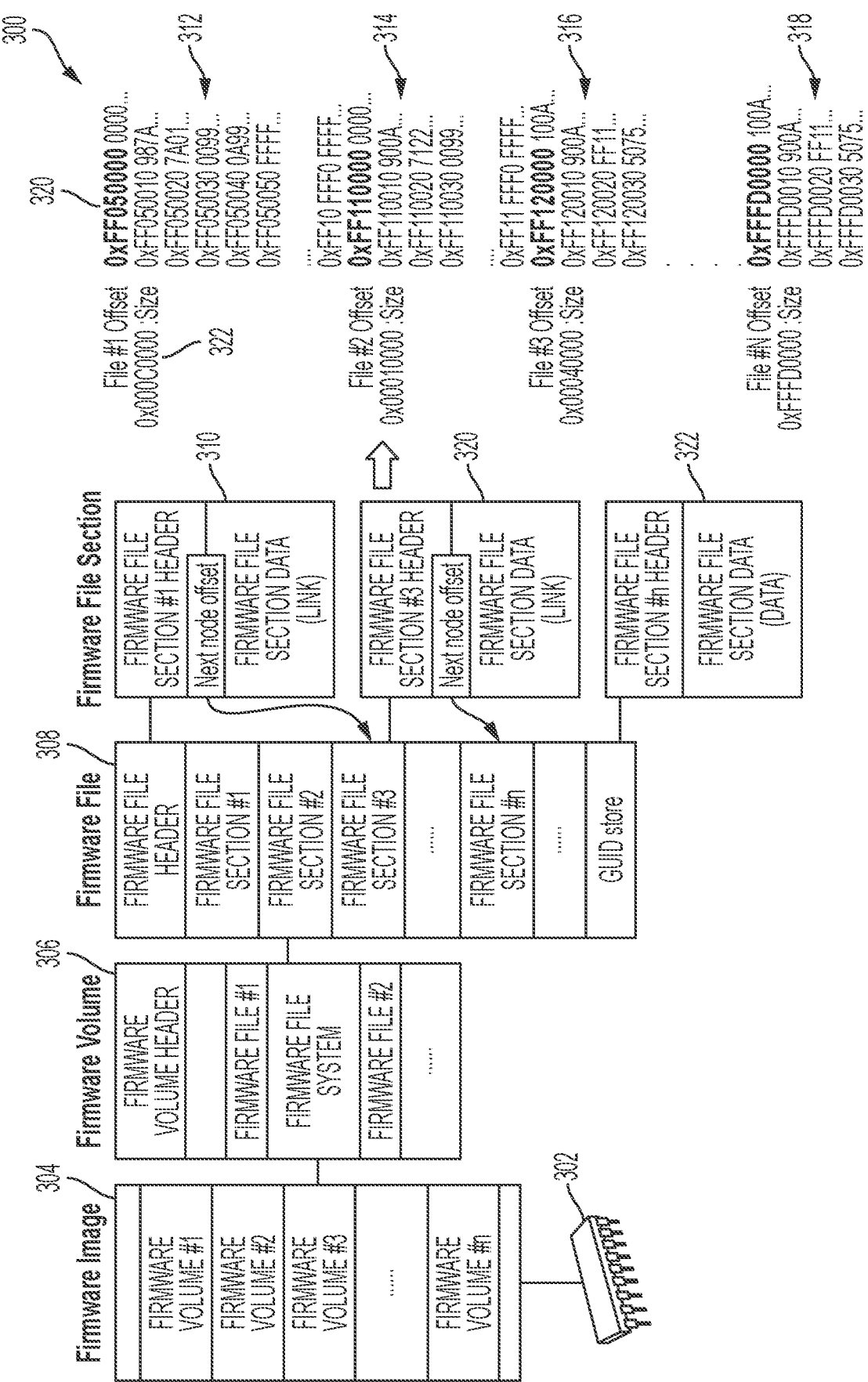
FIG. 3 is an example storage layout of a firmware image according to some embodiments of the disclosure.

An example layout 300 of a firmware memory of an information handling system is shown in FIG. 3. As shown in FIG. 3, a firmware memory 302 may include multiple firmware volumes in a firmware image 304 stored on the firmware memory 302. In some embodiments, only a single firmware volume may be stored in a firmware memory 302, while in other embodiments up to four, or more, firmware volumes may be stored in a firmware image 304 of a firmware memory 302. Each firmware volume 306 may include one or more firmware files. In some embodiments, for example, each firmware volume 306 may include a firmware volume header, a firmware file system, and one, two, or more firmware files. Each firmware file 308 may include one or more firmware file sections. For example, a firmware file 308 may include one, two, three, or more firmware file sections. A firmware file 308 may also include a firmware file header, and a globally unique identifier (GUID) storage area. The GUIDs stored in the GUID storage may be GUIDs of the firmware volume in which the firmware file resides, GUIDs of the firmware file 308, or GUIDs of sections of the firmware file. Firmware file sections may, for example, be firmware modules, individually updated by a modular firmware update. Each firmware file section 310, 320, 322 may include a firmware file section header and firmware file section data. In some embodiments, firmware file sections may include links to firmware file section data stored at other locations in the memory 302 or on another memory. Each section of firmware file data may begin at an offset, such as offset 320, indicating a location at which the firmware file section data begins in the memory 302, such as an address within the memory 302. For example, the offset 320 for a first firmware file section data 312 may be 0xFF050000. Each firmware file may also be associated with a firmware file section size, such as firmware file section size 322, indicating an amount of memory allocated to the firmware file section. For example, the first firmware file section data 312 may have a size 322 of 0x00000000. During a firmware build where space is allocated to firmware modules and the firmware is stored on the memory 302, more memory than is required for data of a firmware file section may be allocated to the firmware file section. The firmware file size of each firmware file section may thus include unused memory space that is allocated to the firmware file section. In some embodiments, such allocation may be performed based on a determination that an update to the firmware file section data may require more space than data of a current firmware file section requires. Each firmware file section data set 312 may include one or more lines of data comprised of multiple data words. Each data word may, for example, include four hexadecimal characters. A second firmware file section data set 314 may have a size and offset that differs from the first firmware file section data set 312. Likewise, a third firmware file section data set 316 may reside within a third firmware file section 320 and may have a size and offset that differs from the first firmware file section data set 312 and the second firmware file section data set 314. Multiple firmware file section data sets may be included in a firmware file section, up to an Nth firmware file section data set 318 within an Nth firmware file section 322. Offsets, such as offset 320, and sizes, such as size 322, of firmware file sections, such as firmware modules, may be stored in an offset list of the firmware volume containing the firmware modules when the firmware volume is built and stored on the memory 302 or after mapping the firmware volume at a later time. An offset list may, for example, include a list of GUIDs or pointers to GUIDs of firmware modules and/or volumes stored on a memory, offsets at which firmware modules and/or volumes are stored on the memory, sizes of firmware modules or volumes stored on the memory, and other information regarding a firmware image stored on a memory.

Figure 4A:
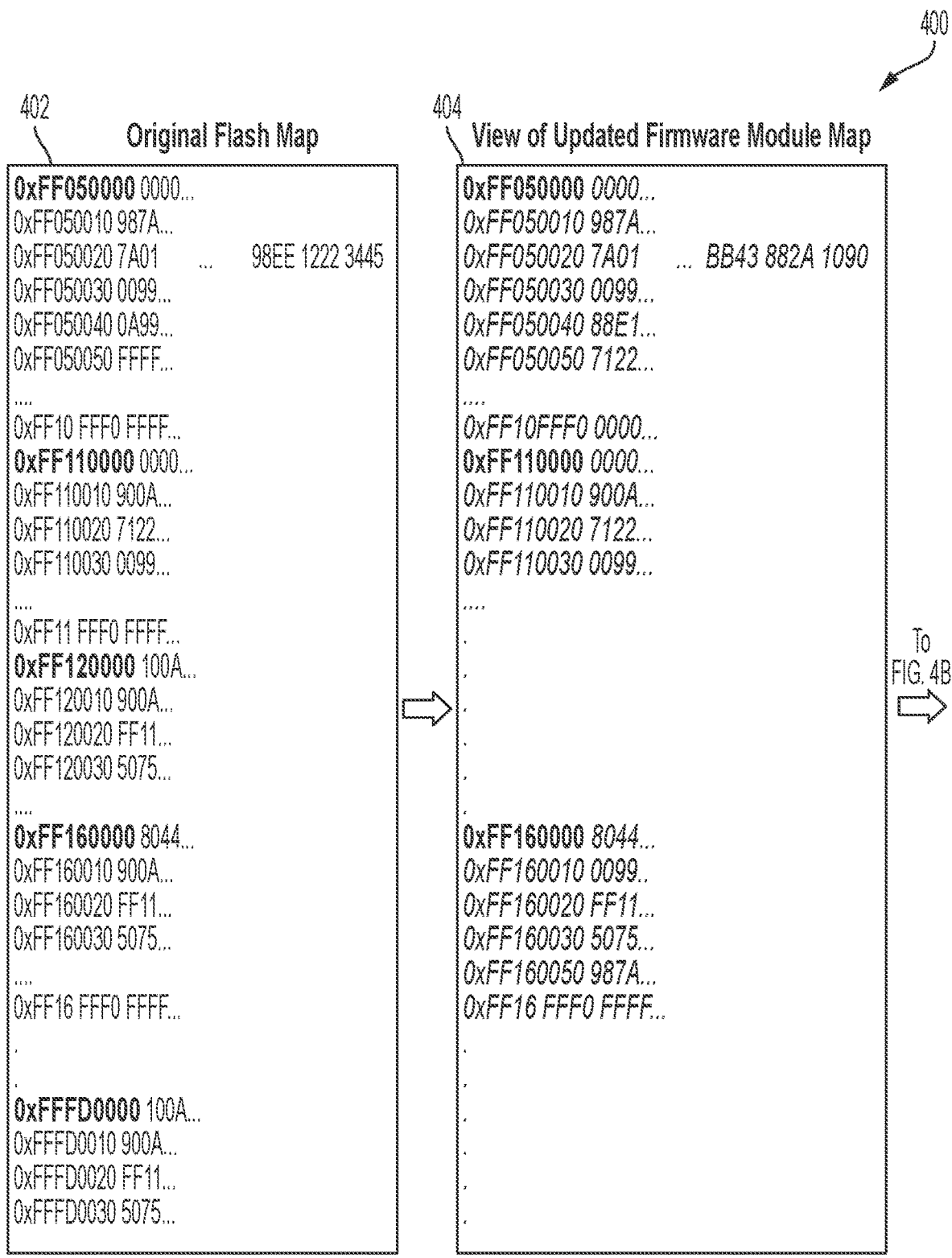
FIG. 4A is an example memory layout at multiple stages of a process for updating one or more firmware modules of an information handling system according to some embodiments of the disclosure.
Figure 4B:
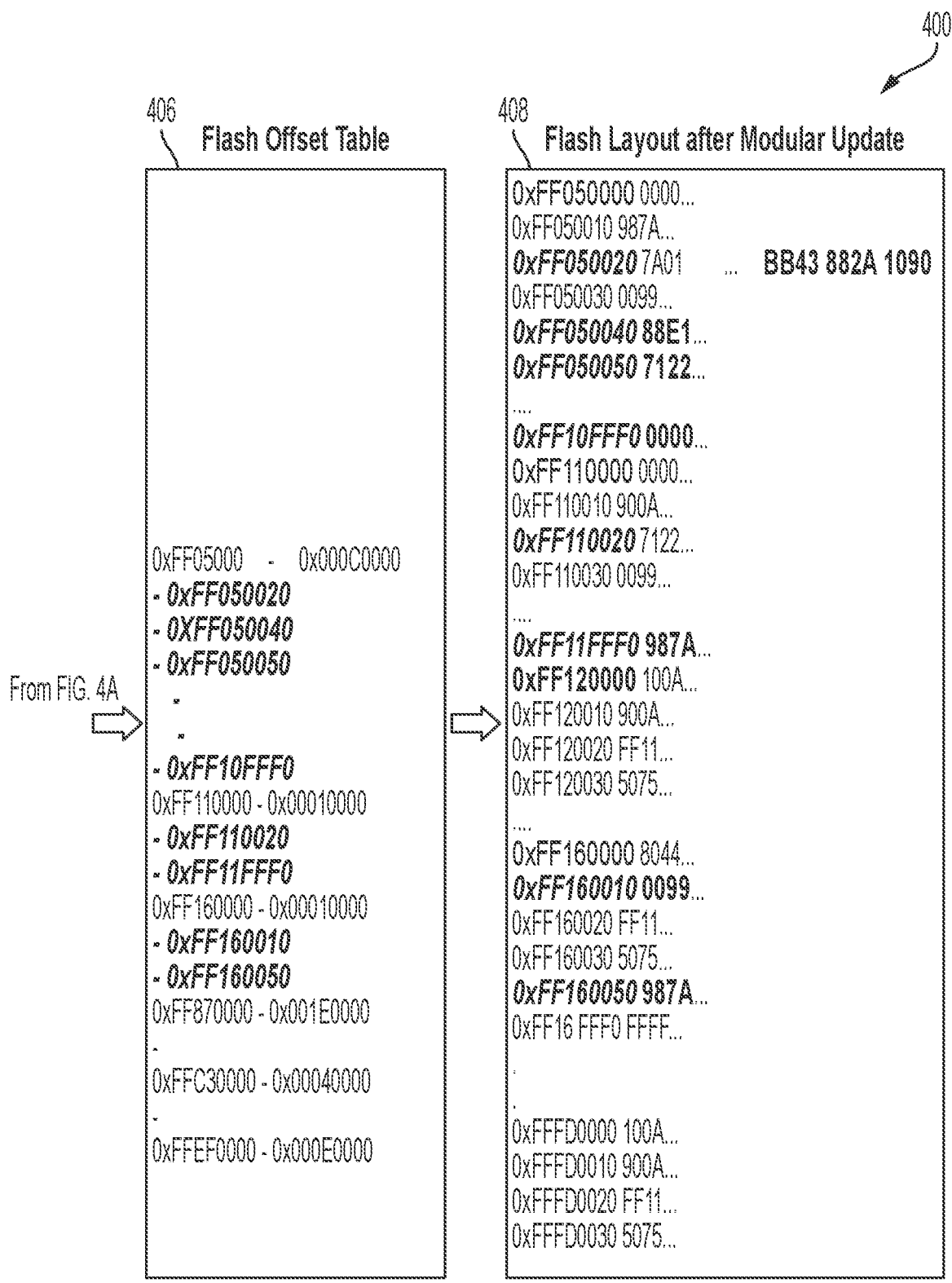
FIG. 4B is an example memory layout at additional stages of a process for updating one or more firmware modules of an information handling system according to some embodiments of the disclosure.

Modules of a firmware of an information handling system may be updated individually to reduce a downtime required for application of an update. An example layout 400 of data during multiple stages of a firmware update is shown in FIGS. 4A-B. An original flash map 402 of a firmware image may include multiple firmware modules, with the beginning of each module indicated by a flash offset, such as 0xFF050000, 0xFF110000, etc. The flash modules may, for example, be firmware files or firmware file sections. Firmware file sections may be housed within firmware files, and the firmware files may be housed within the firmware volume. The original flash map 402 may be a flash map of a firmware volume stored in a flash firmware memory of the information handling system when an update to one or more modules of the firmware volume is received.

A received update package may include updates to multiple firmware modules included in the original flash map 402. The original flash map 402 may, for example, be an Intel Silicon Package portion of a system BIOS firmware volume. An example map 404 of an update to multiple firmware modules may include multiple changes to multiple firmware modules of the firmware volume shown in flash map 402. The update may, for example, include an Intel infrastructure processing unit (IPU) BIOS firmware update drop including one or more security fixes. For example, an update package including updates to one or more firmware modules may be scanned to generate the updated firmware module map 404 by comparing the received update package with the original flash map and determining one or more firmware modules that are updated. In some embodiments, a firmware module update package may be generated including only firmware modules of the update package, such as only firmware file section data sets, that are changed in the firmware update. The original flash map 402 may, for example, be generated upon receipt of a firmware update, to allow the information handling system to determine a current content of a firmware volume stored on the flash firmware memory.

The comparison may be used to generate a flash offset table 406 indicating locations in the memory of the information handling system at which current firmware modules that are updated by the firmware update package are stored. The flash offset table may, for example, be a modular firmware offset list, as described herein. The flash offset table 406 may include identifiers of offsets, such as 0xFF050000, 0xFF110000, 0xFF160000, 0xFF870000, 0xFFC30000, and 0xFFEF0000 at which firmware modules to be updated begin within the memory. The flash offset table may also include sizes of portions of the memory that are allocated to the firmware modules to be updated, such as 0x00000000, 0x00010000, 0x001E0000, 0x00040000, and 0x000E0000. The sizes may, for example, include an area of the memory in which the current firmware module is stored and unused space within the memory allocated to the firmware module, such as empty space following the firmware module and preceding a subsequent firmware module in the memory. The flash offset table may also include further offsets within each firmware module, such as offsets indicating a plurality of words containing one or more words that are changed by the firmware update, such as 0xFF050020, 0xFF050040, and 0xFF050050 within the firmware module indicated by 0xFF050000.

The flash offset table 406 may be used in applying the updates to each of the firmware modules to create an updated firmware module. The flash layout following the modular update 408 may include multiple updated firmware modules updated using the updated firmware module map 404 and the flash offset table 406. For example, the flash offset table 406 may be used by the information handling system to determine a location of a firmware module to be updated and the updated firmware module map 404 may be used to determine a content of the update to be overwritten on the current firmware module. In some embodiments, an entire firmware module may be overwritten, while in other embodiments, firmware modules may be updated at a word level. For example, if the flash offset table indicates that a firmware module beginning at flash offset 0xFF050000 is to be updated, and that lines 0xFF050020, 0xFF050040, and 0xFF050050 are to be updated, the information handling system may overwrite one or more words in the existing flash module that differ from one or more corresponding words in the flash update package. For example, bolded words 8843, 882A, and 1090 in line 0xFF050020 may be overwritten, and may thus differ from the words 98EE, 1222, and 3445 present in the corresponding locations in the original flash map 402. Updating the firmware modules may also include determining whether a size of space allocated to each firmware module is sufficient for storage of the updated firmware module. If sufficient space is allocated for storage of the updated firmware module, the firmware module may be updated at its location in the flash memory. If insufficient space is allocated for storage of the updated firmware module, at least a portion of the updated firmware module may be stored in a different area of the memory, or another memory such as an extended system partition of an SSD or hard drive of the information handling system. Furthermore, a pointer to the different location at which the portion of the memory is stored in the memory or in a different memory may be stored in the memory. Thus, in some embodiments, the information handling system may update only firmware modules that are changed by a received firmware update, reducing an amount of downtime required over an update in which a full firmware volume and/or file is overwritten. Updating only words in firmware modules that are changed by a firmware update may reduce an amount of time required for a firmware update. Furthermore, updating only firmware modules and/or words that are changed by a firmware update may, in some cases, allow for application of updates to a firmware without rebooting an information handling system, where overwriting an entire firmware volume may require a reboot of an information handling system.

Figure 5:
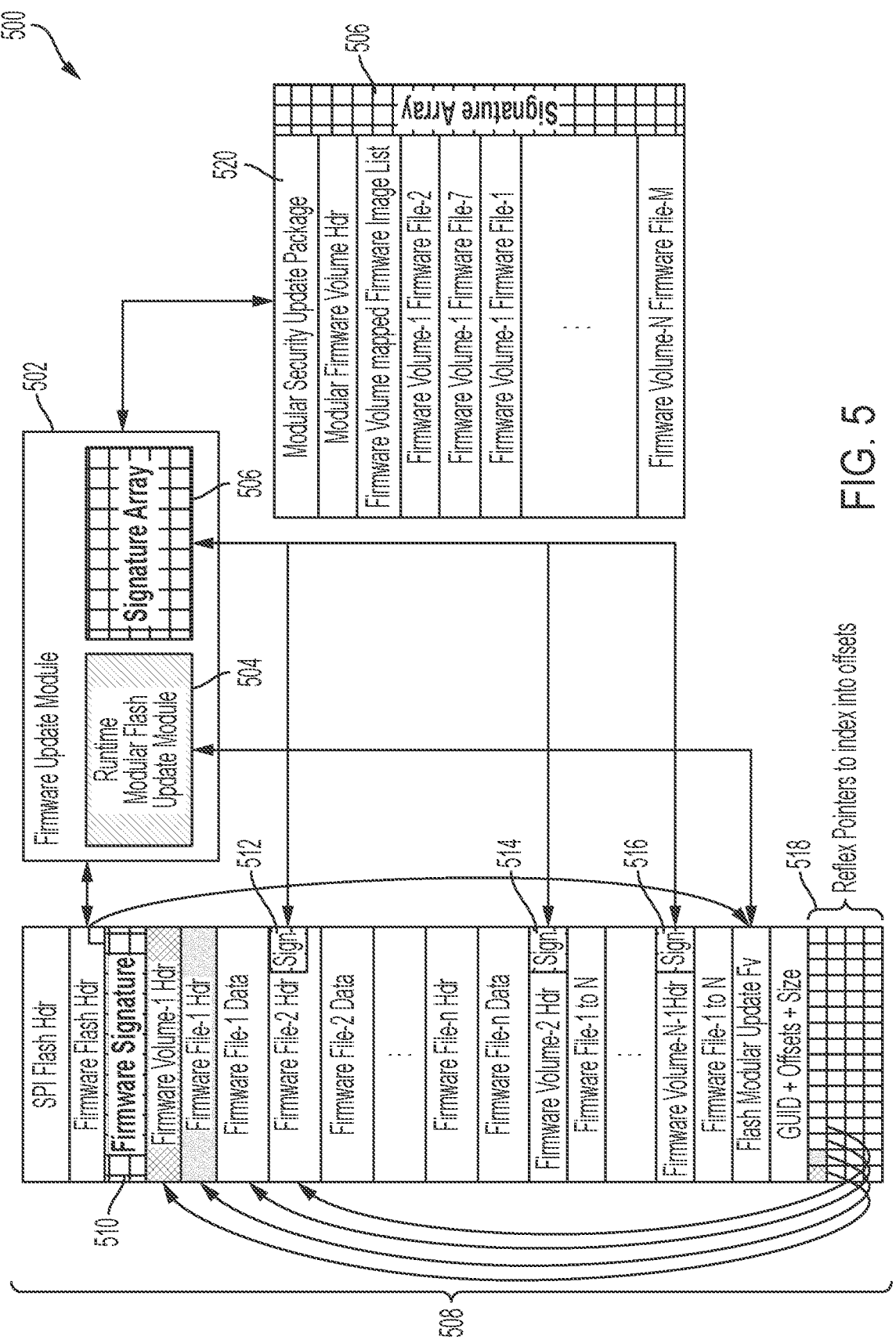
FIG. 5 is a block diagram of an example system for signing one or more updated firmware modules according to some embodiments of the disclosure.

When updating firmware modules, updated signatures for the firmware modules, volumes, files, and, in some embodiments, an entire firmware memory, may be used to authenticate the updated firmware. An example block diagram of a system 500 for updating firmware signatures with a modular firmware update is shown in FIG. 5. A firmware update module 502, such as a firmware update module of the information handling system, may include a runtime modular flash update module 504 for applying one or more updates to one or more firmware modules. The firmware update module 502 may also include a signature array 506, for application of updated signatures to the updated firmware. Signatures of the signature array 506 may, for example, be requested and received by the information handling system from a remote signature server. For example, a firmware update package, such as a security vulnerability fix firmware update package, may be received by the firmware update module 502 of the information handling system. The firmware update module 502 may assemble a modular security firmware update package 520, which may include information regarding the firmware modules to be updated. For example, the modular security firmware update package 520 may include an index of one or more firmware volumes to be updated based on the received update package including a list of firmware modules to be updated, such as a list of firmware file and/or file section names, parent firmware volume names of the firmware modules to be updated, and globally unique identifiers (GUIDs) for the firmware modules, files, file sections, and/or volumes. In some embodiments, the modular security update package may include an update to a firmware volume header, a firmware volume mapped firmware image list of GUIDs for firmware modules to be updated and, in some embodiments, offsets within the memory at which firmware modules to be updated are stored, and one or more firmware module updates, such as an update to second and seventh firmware files of a first firmware volume, updates to a first firmware file of a third firmware volume, and other updates to other firmware files. The firmware update module 502 may request a signature array 506 from a remote signature server. In some embodiments, requesting the signature array may include providing the signature server with information regarding the update, such as identification of firmware modules, files, file sections, and/or volumes that are changed in the generated modular security update package. The firmware update module 502 may incorporate received signatures into the modular security update package and may apply the updated signatures when updating one or more firmware modules of the information handling system. The signed modular security firmware update package 520 including the signature array 506 may, for example, comprise a signed BIOS image for the firmware modules to be updated. In some embodiments, firmware modules may be referred to as firmware fragments. In some embodiments, the runtime modular flash update module 504 may obtain vendor provided security patches and scan the firmware layout of the current stored firmware image to dynamically generate modular fragments using a received firmware update package to form the modular security update package.

The firmware update module 502 may apply the signature array 506 to update one or more firmware signatures when updating firmware modules of the information handling system. For example, a plurality of firmware signatures, such as a plurality of firmware signatures for a plurality of firmware modules updated, may be applied to firmware stored in a memory 508 when updating one or more firmware modules of the firmware. As an example, the memory 508 may be a SPI flash firmware memory, and may include a SPI flash header, a firmware flash header, which may include the firmware update module, a firmware signature 510, a header for a first firmware volume, a header for a first firmware file of the first firmware volume, data for the first firmware file of the first firmware volume, a header for a second firmware file of the first firmware volume, data for the second firmware file of the first firmware volume, headers and data for other firmware files of the first firmware volume, a header for a second firmware volume, multiple firmware files of the second firmware volume, a header of a final firmware volume of the information handling system, firmware files of the final firmware volume of the information handling system, a flash modular update firmware volume, other firmware volumes and firmware volume headers, and a modular firmware offset list for the flash memory firmware image. The memory 508 may, for example, include a single BIOS firmware image, comprising multiple firmware volumes. The modular firmware offset list may, for example, include GUIDs of each firmware module, such as each firmware file and/or each firmware file section, GUIDs of firmware volumes, offsets at which firmware volumes, files, and file sections are stored in the memory 508 and sizes of firmware modules, such as sizes of firmware files or file sections. For example, the modular firmware offset list of memory 508 may include reflex pointers 518 to offsets at which firmware files, file headers, file sections, file section headers, volumes, volume headers, and other firmware elements begin. In some embodiments, the modular firmware offset list may include a table including indexes to GUIDs of a firmware volume and extensible firmware interfaces of the firmware volume. In some embodiments, the modular firmware offset list may be updated following application of an update to a firmware module, to update one or more offsets of the modular firmware offset list and/or to include a pointer to a portion of a firmware module stored on a different memory, such as in an extended system partition on a hard drive or solid-state drive of the information handling system.

A firmware signature 510 for the entire firmware image stored on the memory 508 may be updated using the signature array 506. Furthermore, a signature 512 included in a header of a first updated firmware file, such as a first firmware file including a first firmware module that is updated by the modular security firmware update package 520, may be updated. A signature 514 of a second firmware volume including one or more updated modules may be updated. Furthermore, a signature 516 of a final firmware included in a header of the final firmware volume may be updated. Thus, signatures for a firmware memory, firmware volumes, and other firmware components that are updated during a modular firmware update may be updated using a signature array 506 received from a remote signing server.

Figure 6:
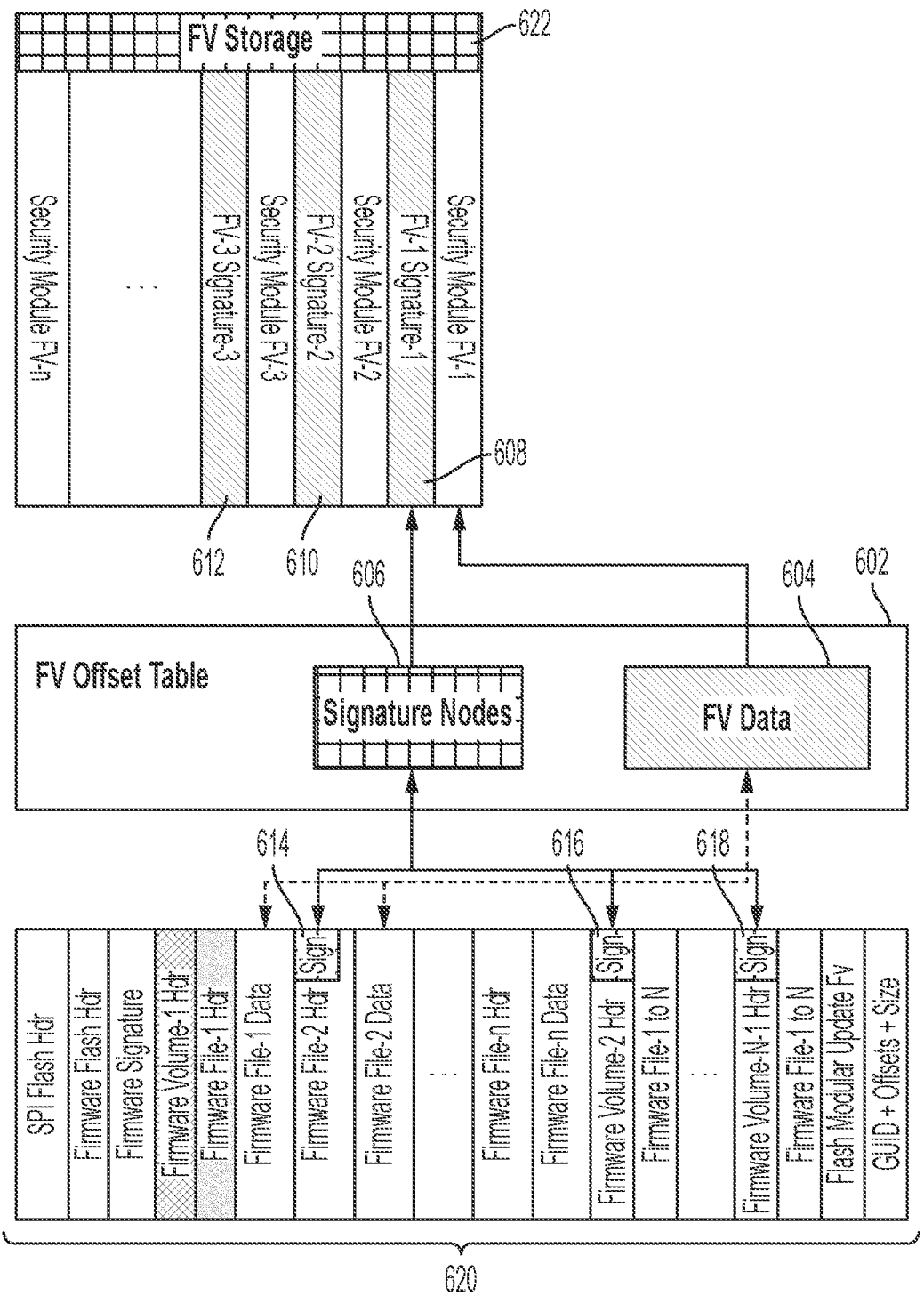
FIG. 6 is a block diagram of an example system for storing modular firmware update information for rolling back one or more firmware module updates according to some embodiments of the disclosure.

In some embodiments, updates to firmware modules, such as a generated modular firmware update package, or a portion of a generated modular firmware update package, may be stored in a memory of the information handling system, to allow the information handling system to individually roll back updates to one or more firmware modules. For example, if an update to a firmware module is determined to be flawed or potentially cause errors, the update to the firmware module may be rolled back, while other updates to other firmware modules may remain in place. An example system 600 for dynamically linking and extending modular firmware storage to support modular recovery and rollback is shown in FIG. 6. For example, firmware modules, or fragments, such as firmware modules in prior states before updating or data to allow rolling back of a firmware module to a prior state, may be stored in a firmware volume storage. In some embodiments, the data stored in the firmware volume storage 622 may include delta data indicating a difference between two firmware module versions, such as a current version of a firmware module and an old version of the firmware module, to allow rolling back of updates to firmware modules. The firmware volume storage 622 may, in some embodiments, include space on the memory 620, such as SPI flash firmware memory, and/or on one or more other memories of the information handling system, such as a solid-state drive or hard drive of the information handling system. The firmware volume storage 622 may include signature data, such as a signature for a first firmware volume 608, a signature for a second firmware volume 610, and a signature for a third firmware volume 612, from a previous firmware version, in addition to previous versions of firmware modules associated with the signatures, such as a previous version of a first security firmware module of a first firmware volume, a previous version of a second security firmware module of a second firmware volume, a previous version of a third security firmware module of a third firmware volume, and previous versions of other firmware modules. The firmware volume storage 622 may also include version data for stored firmware deltas and indexes for firmware modules. In some embodiments, the firmware volume storage 622 may be dynamically tagged at a pre-extensible firmware interface (pre-EFI) phase of booting an information handling system, and a hosted operations support system/business support system (HOB) data channel may be passed from the PEI boot phase to a driver execution environment (DXE) boot phase to support automatic recovery based on a firmware offset list along with a version for a rollback of a firmware module to a previous stable module.

A firmware volume offset table 602 may be used to store information regarding previous versions of firmware modules and may be used to individually roll back updates to individual firmware modules. For example, the firmware volume offset table 602 may include firmware volume data 604, such as data regarding where previous versions of firmware modules are stored and data regarding which firmware modules the previous versions of firmware modules correspond to. For example, information indicating offsets at which a corresponding current firmware module is stored in the memory 620 may be stored in the firmware volume data 604, along with information indicating where previous versions of the firmware module are stored by the information handling system. The firmware volume offset table 602 may also include signature node data 606, such as data for updating signatures of a firmware volume and/or firmware modules, when rolling back one or more updates to one or more firmware modules. The signature node data 606 may, for example, include data regarding signatures for previous versions of firmware modules and/or signatures for firmware volumes including the previous versions of the firmware modules.

When an information handling system determines to roll back an update to the firmware module, the information handling system may use the firmware volume offset table 602 to determine a location of the firmware module to be rolled back stored in the memory 620 and a location of a previous version of the firmware module stored in the firmware volume storage 622. The information handling system may overwrite the firmware module, such as a second firmware file of a first firmware volume of the memory 620 with a previous version of the firmware module, and may update a signature, such as a signature 614 in a firmware file header for the second firmware file based on the rollback. Firmware volume signatures 616, 618 may also be updated when firmware modules within the firmware volumes are rolled back. Thus, instead of rolling back an entire firmware, or entire firmware volume, if a fault is discovered in a firmware module following an update, the information handling system may roll back the update to the individual firmware module, while updating signatures of the firmware to reflect the rollback.

Figure 7:
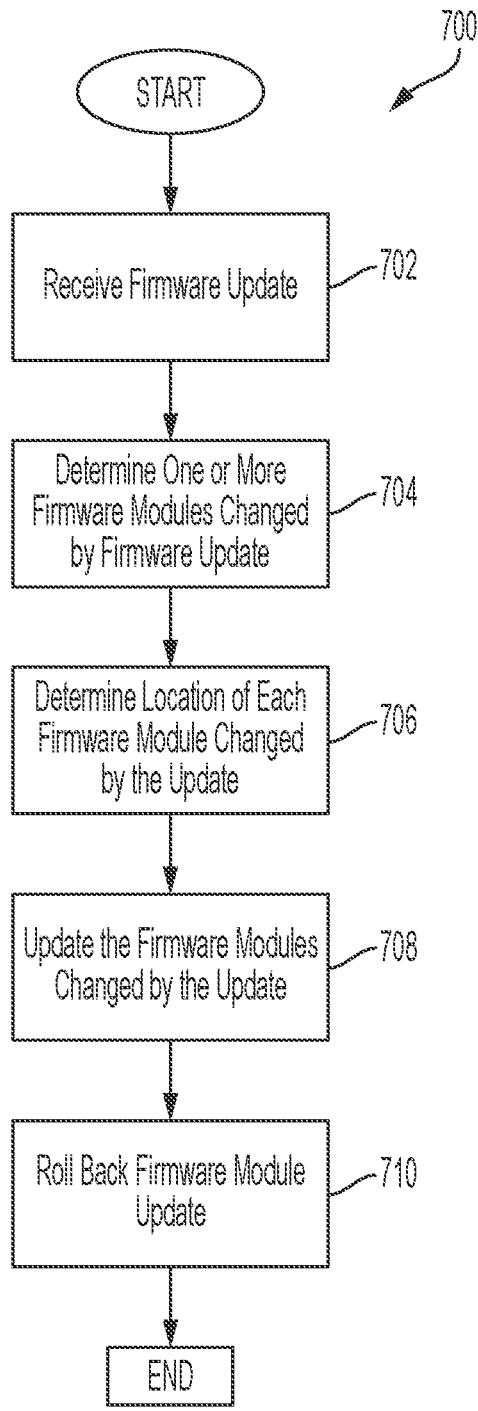
FIG. 7 is a flow chart of an example method for updating one or more firmware modules according to some embodiments of the disclosure.

Application of updates to individual modules of a firmware of an information handling system may reduce an amount of system downtime required to update the firmware of the information handling system. An example method 700 for updating firmware modules is shown in FIG. 7. The method 700 may begin at step 702 with receipt of a firmware update. For example, an information handling system may receive a firmware update, such as a security or other firmware update, from a remote information handling system. The firmware update may, for example, be a firmware update package including an update to one or more firmware volumes of the information handling system. In some embodiments, the received firmware update may be a received modular firmware update package, including modular updates to one or more firmware modules of the information handling system.

At step 704, the information handling system may determine one or more firmware modules that are changed by the firmware update. For example, the information handling system may, in some embodiments, map a current firmware of the information handling system stored on a firmware memory of the information handling system and may compare the received firmware update with the current firmware. In some embodiments, the information handling system may use a firmware offset list to determine where each firmware module of the current firmware memory begins and/or a size of each firmware module of the current firmware memory. Firmware modules of the current firmware memory that have different contents from corresponding portions of the received firmware update may be firmware modules that are changed by the received firmware update. For example, the received firmware update may change one or more words of one or more firmware modules stored on the memory of the information handling system, and the information handling system may determine firmware modules to update by determining which firmware modules currently stored in the firmware memory of the information handling system have one or more words that differ from the corresponding contents of the received firmware update. A firmware module may, for example, be a boot device select (BDS), PEI, or DXE firmware module.

At step 706, the information handling system may determine a location of each firmware module changed by the update. For example, the information handling system may determine a location in a firmware memory of the information handling system at which each firmware module changed by the received firmware update is stored. Such a determination may, for example, be made using a firmware offset list specifying offsets for each firmware module of the information handling system. A firmware offset may be determined for example, at which a first firmware module updated by the received firmware update begins in the firmware memory of the information handling system. In some embodiments, sizes of each firmware module to be updated may also be determined. For example, the firmware offset list may include a size of a portion of a firmware memory of an information handling system allocated to each firmware module.

At step 708, the information handling system may update the firmware modules changed by the received update. For example, the information handling system may use the determined location of each firmware module to be updated to overwrite at least a portion of each firmware module having contents that differ from the corresponding contents of the received firmware update. In some embodiments, the information handling system may perform the update at a word level, such as updating only four character hexadecimal words that are different in the firmware update from the current contents of the firmware module. Thus, the firmware update may be applied to individual firmware modules of the information handling system. Updating firmware modules, instead of overwriting an entire firmware volume or image including one or more firmware modules to be updated, may reduce an amount of time required to implement the firmware update. For example, some firmware modules may not require a system reboot for application of a firmware update, but overwriting an entire firmware volume including the firmware modules may require such a reboot. Thus, modular firmware updates may allow an information handling system to update one or more modules of a firmware without overwriting an entire firmware image or an entire firmware volume on a SPI flash firmware memory of the information handling system.

In some embodiments, an information handling system may also, at step 710, roll back a firmware module update. For example, deltas for firmware module versions may be stored in a firmware volume storage of the information handling system. If an updated firmware module is determined to be flawed, the individual firmware module may be rolled back to a last known, or other, good version of the firmware module. Data for rolling back firmware modules, such as locations of storage of data for rolling back firmware modules, may be stored in a firmware module offset list of the information handling system.

Figure 8:
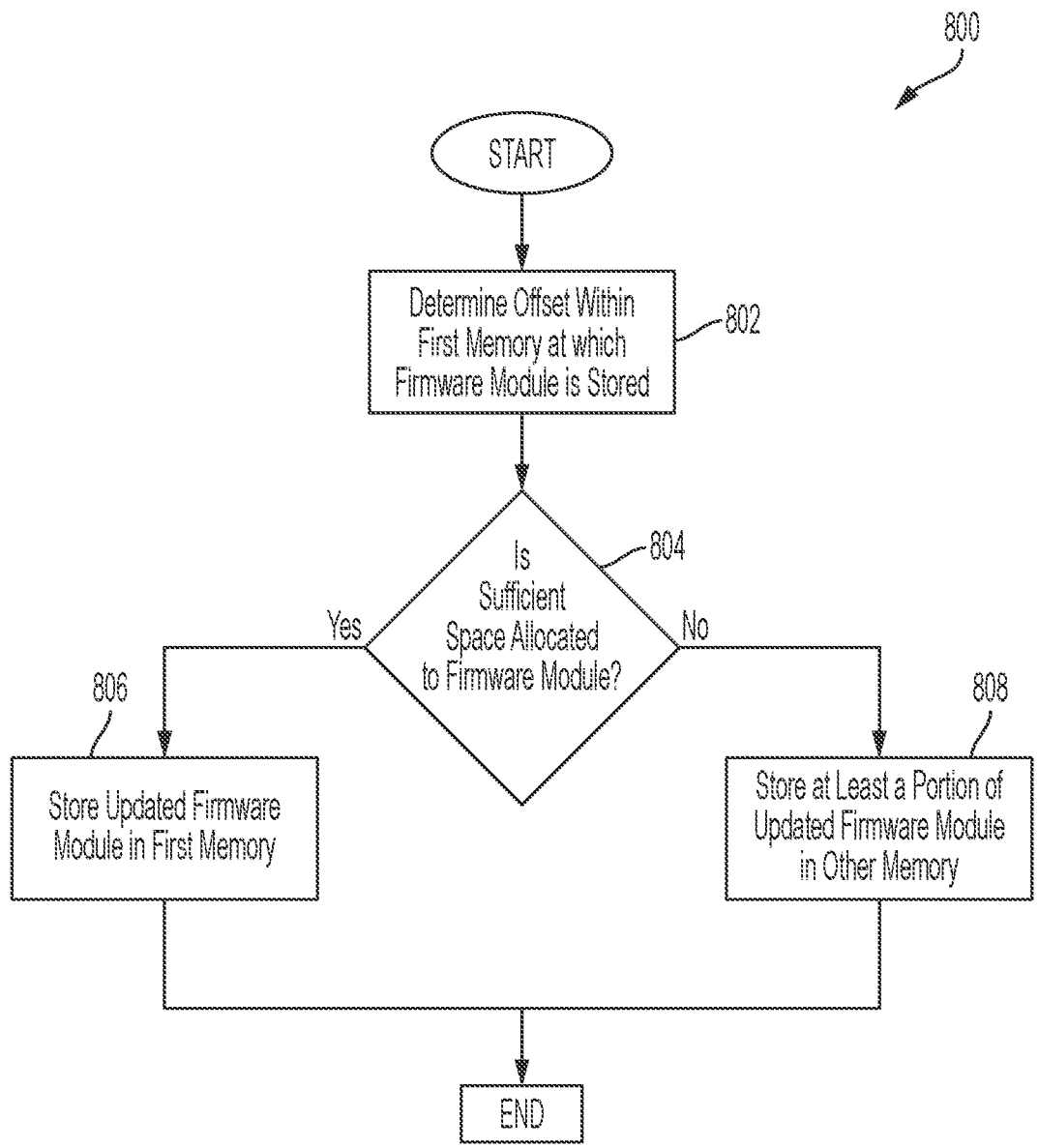
FIG. 8 is a flow chart of an example method for updating a firmware module based on an amount of space allocated to the firmware module in a firmware memory according to some embodiments of the disclosure.

At firmware build time, firmware modules may be intelligently allocated additional storage space to accommodate future modular firmware updates. In applying a modular firmware update, an information handling system may determine whether sufficient space is available in a portion of a firmware memory allocated to the firmware module for storage of the updated firmware module. An example method 800 for updating a firmware module based on a determination of whether sufficient space is allocated in a firmware memory for storage of the updated firmware module is shown in FIG. 8. The method 800 may begin at step 802 with determination of an offset within a first memory, such as a flash firmware memory, at which a firmware module to be updated is stored. For example, the step 802 may be performed as a part of step 706 of the method 700 following receipt of a firmware update. An information handling system may, for example, determine an offset within a first memory at which the firmware module is stored using an offset list stored in the first memory, or another memory, of the information handling system.

At step 804, the information handling system may determine whether sufficient space is allocated to the firmware module to store the firmware module once the update is applied. For example, a predetermined amount of space within the first memory may be allocated to the current firmware module. In some embodiments, the firmware module may require more space following application of the update than the firmware module did prior to the update. In some embodiments, the amount of space allocated to the firmware module within the first memory may be greater than an amount of space required to store a current version of the firmware module, prior to application of the update. For example, an amount of space within the first memory following an end of the current version of the firmware module and prior to a starting point of a header and/or data of a next firmware module may be left empty and allocated to the firmware module. An amount of space allocated to the firmware module, such as an amount of used and unused space in the first memory allocated to the firmware module may be retrieved from the offset list, in addition to the location of the firmware module within the first memory. In determining whether sufficient space is allocated to the firmware module within the first memory for storage of the updated firmware module, the information handling system may compare an amount of space within the first memory required for storage of the firmware module after the firmware module is updated with an amount of space allocated to the firmware module.

If sufficient space is available within the first memory for storage of the firmware module following application of the update, the information handling system may, at step 806, update and store the updated firmware module within the first memory, such as within the space allocated to the firmware module within the first memory. For example, the information handling system, at step 806, may update the firmware module as described with respect to step 708 of method 700. Thus, if sufficient space is allocated in the first memory to store the updated firmware module, the information handling system may update and store the updated firmware module in the first memory without overwriting contents of other firmware modules with the contents of the firmware module, even if the size of the firmware module following the update exceeds the size of the firmware module prior to the update.

If sufficient space is not allocated to the firmware module in the memory for storage of the firmware module following the update, the information handling system may, at step 808, update and store at least a portion of the updated firmware module in a different memory, such as an extended system partition on a hard drive or solid-state drive of the information handling system. For example, if the information handling system determines that storage of the updated firmware module within the first memory would require overwriting at least a portion of another firmware module in the first memory, such as a firmware module immediately following the firmware module being updated, the information handling system may store at least a portion of the updated firmware module in another memory. In some embodiments, the information handling system may store the entire updated firmware module in a different memory and store a pointer to the updated firmware module in the first memory. In some embodiments, the information handling system may update a portion of the firmware module stored in the first memory and may store another portion of the firmware module in a different memory. The information handling system may store a pointer to the portion of the firmware module stored in the different memory in the first memory. The pointer may, for example, be stored in a portion of the first memory allocated to the firmware module that was updated. The method 800 may, for example, be performed along with or as part of the method 700. Thus, if insufficient space is allocated to a firmware module to be updated in a first memory, an information handling system may store a portion or all of the updated firmware module in a different memory. Such flexible storage can allow the information handling system to avoid overwriting other firmware modules in the first memory with contents of the firmware module being updated.

Figure 9:
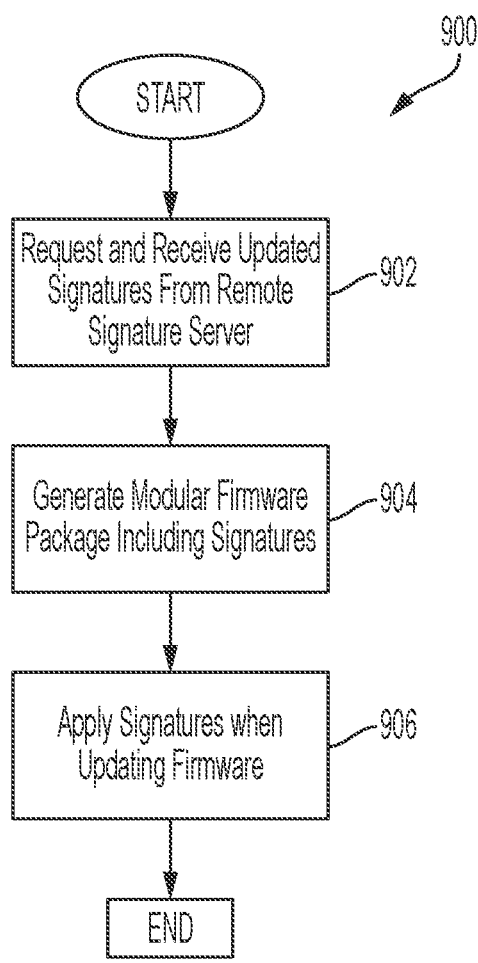
FIG. 9 is a flow chart of an example method for obtaining and applying signatures for one or more updated firmware modules according to some embodiments of the disclosure.

An information handling system may update one or more signatures of a firmware after updating one or more modules of the firmware. An example method 900, shown in FIG. 9, may begin, at step 902, with requesting and receiving updated signatures from a remote signature server. For example, after determining one or more firmware modules changed by the firmware update, at step 704 of FIG. 7, the information handling system may transmit a request for updated signatures to a remote signing server. The requested signatures may, for example, include signatures for an entire firmware image, signatures for one or more firmware volumes including firmware modules that are to be updated, signatures for one or more firmware files including firmware modules that are to be updated, and other firmware signatures. In some embodiments, the information handling system may transmit information identifying one or more firmware modules to be updated, such as GUIDs of the firmware modules to be updated and/or contents of the updated firmware modules, for use by the remote signing server in generating one or more signatures. The information handling system may receive the signatures from the remote singing server.

In some embodiments, the information handling system may incorporate the received signatures into a modular firmware update package. For example, a received update package may include an entire updated firmware volume, one or more updated firmware modules, or other firmware update contents. The information handling system may, after determining the firmware modules to be updated, generate a modular firmware update package including one or more updates to one or more firmware modules, at step 904. For example, portions of a received update package that apply to individual firmware modules may be packaged in a modular firmware update package. In some embodiments, for example, an entire updated firmware volume, or file, received in the firmware update package may be mapped to determine portions of the firmware volume, or file, that correspond to modules of a firmware stored by the information handling system but differ from current contents of the firmware modules of the information handling system. The information handling system may generate one or more updates to one or more firmware modules based on the received firmware update package and may incorporate the updates in a modular firmware package. In some embodiments, the information handling system may transmit the entire modular firmware package to the remote signing server when requesting signatures at step 902. When the signatures are received from the remote signing server, the information handling system may generate a modular firmware update package including the signatures. For example, the information handling system may incorporate the received signatures into the received modular firmware update package. In some embodiments, the information handling system, or the remote signing server, may dynamically compute a hash of a new firmware update image using a static signature to cross check and update one or more signatures of the flash firmware memory.

At step 906, the information handling system may apply signatures when updating the firmware. For example, such application of signatures may be performed as part of step 708 of the method 700. Application of signatures may include updating an overall signature of a firmware memory image, updating one or more signatures of one or more firmware volumes including firmware modules that are updated, updating one or more signatures of one or more firmware files including one or more firmware modules that are updated, and updating other signatures. Thus, signatures of a firmware of an information handling system that is updated with one or more modular firmware updates may also be updated to maintain authentication and security of the firmware of the information handling system. In some embodiments, the steps of method 900 may be performed alongside or as part of the method 700 in application of modular firmware updates. Updating signatures of a firmware when updating one or more firmware modules may allow secure boot functionality following the update to one or more firmware modules.

Figure 10:
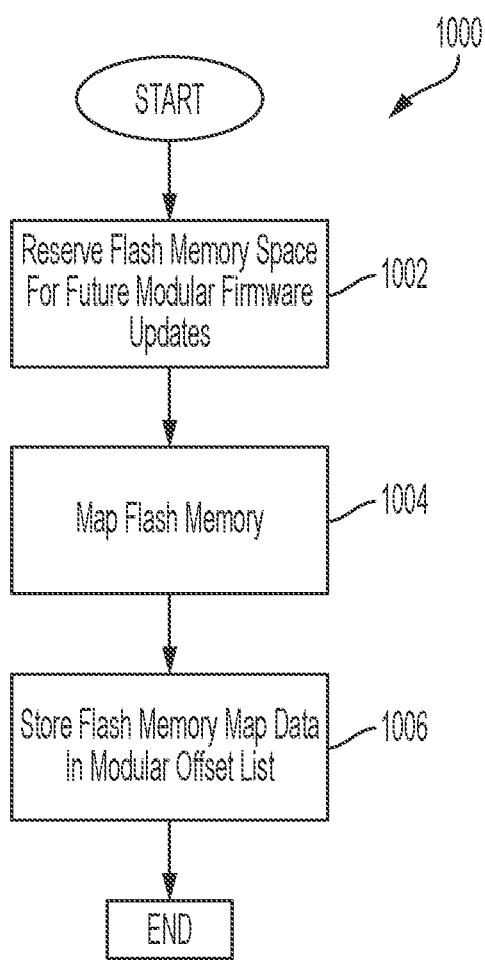
FIG. 10 is a flow chart of an example method for building a firmware memory layout and storing information regarding the layout in a modular offset list according to some embodiments of the disclosure.

At firmware build time, an information handling system may reserve unused space for one or more firmware modules for use in future modular firmware updates. An example method 1000, for reserving space for future firmware module updates is shown in FIG. 10. The method 1000 may begin, at step 1002, with reserving flash memory space for future modular firmware updates. For example, an information handling system, at firmware build time, may reserve space for one or more firmware modules on a flash firmware memory of the information handling system. In some embodiments, the information handling system may determine a size of each of a plurality of firmware modules and may reserve space within a flash memory on which the firmware modules will be stored in excess of the space required for storage of each of the firmware modules. As one example, a first firmware module may be allocated space in addition to space required for storage of the first firmware module following an end of the first firmware module and before a beginning of a next firmware module. The additional space allocated to the first firmware module may remain unused until a modular firmware update is applied to the firmware module that requires more space than was used by the original version of the firmware module. In some embodiments, a predictive algorithm for allocating more space than is required for storage by a current version of a firmware module to the firmware module may be used to determine an amount of memory space to allocate to the firmware module based, at least in part, on a frequency of usage of the firmware module, a frequency of updates to the firmware module, a security level of the firmware module, and other characteristics of the firmware module, along with characteristics of other firmware modules stored in the memory. When a modular firmware update is applied to the firmware module, the updated firmware module may make use of the previously unused space allocated to the firmware module, as described with respect to the method 800 of FIG. 8.

At step 1004, the information handling system may map a flash memory containing the firmware of the information handling system. For example, the information handling system may determine a location at which each firmware module is stored, such as an offset indicating a beginning of a location within the memory at which each firmware module is stored. In some embodiments, the information handling system may also determine a size of a memory space allocated to each firmware module, such as an amount of space taken by the firmware module and an amount of empty space in the memory between an end of the space currently used to store the firmware module and a beginning of space used to store a next firmware module. In some embodiments, steps 1002, 1004 may be performed by a flash layout build module. At step 1006, the information handling system may store data obtained during the mapping of the flash memory at step 1004. For example, the information handling system may store in a modular firmware offset list the location of each of the firmware modules, such as the offsets within the memory at which each of the firmware modules begin, and the size of the area of the memory allocated to each firmware module. In some embodiments the modular firmware offset list may be stored within a firmware memory, such as the SPI flash firmware memory, of the information handling system. Thus, an information handling system may organize and map a firmware memory to allow for future modular firmware updates.

Figure 11:
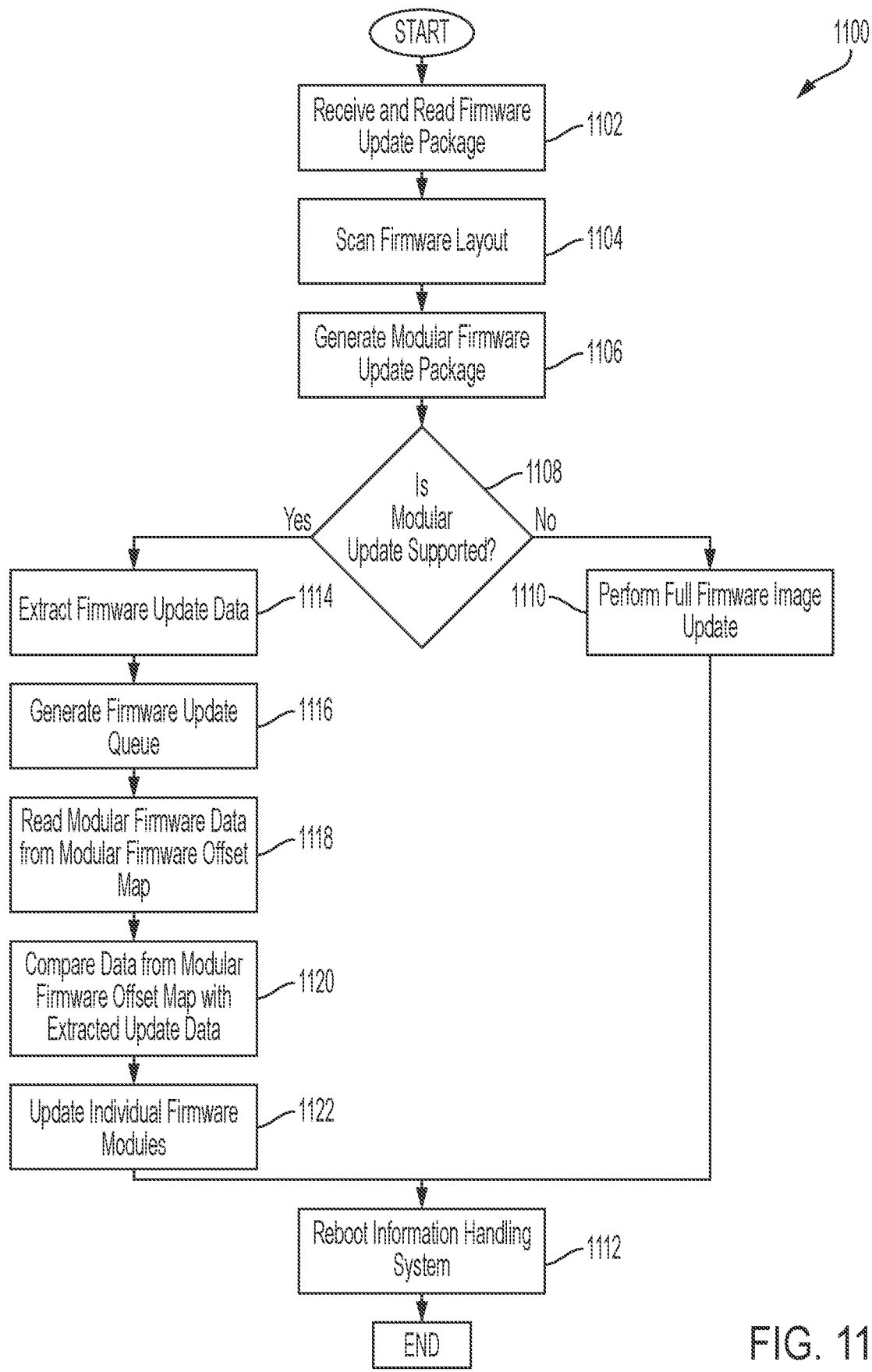
FIG. 11 is a flow chart of an example method for updating a firmware based on whether modular firmware updates are supported according to some embodiments of the disclosure.

An information handling system may determine whether modular firmware updates are supported and may update a firmware of the information handling system based on the determination. An example method 1100 for updating a firmware of an information handling system is shown in FIG. 11. The method 1100 may begin, at step 1102, with receiving and reading a firmware update package. For example, an information handling system may receive a firmware update package for updating one or more firmware volumes of the information handling system. In some embodiments reading the firmware update package may include determining whether a modular firmware update or a full firmware update should be performed based on the contents of the firmware update package. At step 1104, the information handling system may scan the firmware layout of the current firmware memory and the received firmware update, and, at step 1106, may generate a modular update package including one or more updates to one or more firmware modules of the information handling system based on the firmware layout of the current firmware and the received firmware update package. For example, the information handling system may scan a predictive firmware layout of the information handling system and may dynamically generate multiple modular firmware fragments for incorporation in the modular update package using the received firmware update. In generating the modular update package, the information handling system may also request and receive one or more signatures from a remote signing server for incorporation into the modular update package. The signatures may, for example, include a BIOS image signature for the updated firmware modules.

At step 1108, the information handling system may determine whether application of modular firmware updates is supported by the information handling system. For example, the information handling system may determine whether a current version of a firmware to be updated by the information handling system supports modular firmware updates, such as whether one or more firmware volumes to be updated are organized into firmware modules and mapped in a modular offset list, or whether a firmware update module of the information handling system supports application of modular updates to firmware modules. Determining whether application of modular firmware updates is supported may also include determining whether a remote signature server is available for provision of signatures to incorporate in a modular update package for updating one or more modules of the firmware of the information handling system. In some embodiments, steps 1104 and 1106 may be performed following step 1108 and prior to step 1114 if a determination is made that the information handling system supports application of modular firmware updates.

If a determination is made, at step 1108, that the information handling system does not support modular firmware updates, the information handling system may, at step 1110, perform a full firmware image update. For example, the information handling system may overwrite one or more entire firmware volumes of the information handling system. An information handling system may, for example, not support modular firmware updates during application of a first update to a full BIOS image. At step 1112, the information handling system may reboot following and/or during application of the firmware update to the firmware of the information handling system.

If a determination is made, at step 1108, that modular firmware updates are supported, the information handling system may, at step 1114, extract firmware update data. For example, the information handling system may extract a list of file names, GUIDs of firmware elements, such as firmware volumes, files, file sets, file sections, and modules, sizes of firmware elements, an entire image size of a firmware update, and other data regarding the modular firmware update from the modular firmware update package and may store the information in an update package in a separate firmware volume of the information handling system.

At step 1116, the information handling system may generate a firmware update queue. For example, the information handling system may generate a list of firmware modules to be updated using the information extracted from the firmware update package at step 1114. For example, a list of firmware modules, parent firmware volumes of the firmware modules, associated GUIDs of the firmware modules and volumes, and other firmware update data may be read into a firmware update queue.

At step 1118, the information handling system may read modular firmware data regarding the current firmware from a modular firmware offset list of the information handling system. For example, a runtime modular firmware update module may locate a flash modular firmware volume in a SPI flash firmware memory of the information handling system, and may read a modular firmware offset list stored in the SPI flash firmware memory to determine GUIDs of firmware modules and volumes, sizes of portions of the memory allocated to the firmware modules and volumes, offsets for the firmware modules and volumes, and other information regarding firmware modules and volumes stored in the SPI flash firmware memory.

The information handling system may, at step 1120, compare the list of firmware modules to be updated determined at step 1114 with the modular firmware data read at step 1118 to determine firmware modules of the information handling system to be updated. For example, the information handling system may compare GUIDs of firmware modules of the firmware update package included in the firmware update package with GUIDs of firmware modules read from the modular firmware offset list to determine which firmware modules stored in the memory of the information handling system are updated by the received update package, offsets of the firmware modules to be updated, and sizes of memory portions allocated to each of the firmware modules to be updated. The information handling system may construct an update process queue including one or more update events using the update queue of step 1118 and the information regarding the offsets and sizes of each of the current firmware modules to be updated. In some embodiments, an update process queue may be generated for every firmware volume including one or more firmware modules to be updated. The update process queue may, for example, include events for every firmware module to be updated. In some embodiments, all or some of steps 1104-1108 and 1114 may be performed by a security scan module.

At step 1122, the information handling system may update the firmware modules indicated in the update process queue. For example, the information handling system may sequentially read offsets indicating locations of firmware modules to be updated on the SPI flash memory of the information handling system and may update only modules indicated in the update process queue, rather than overwriting entire firmware volumes. In some embodiments, steps 1116-1122 may be performed by a runtime modular flash firmware update module.

In some embodiments, the information handling system may, at step 1112, reboot following application of the modular firmware updates. For example, if security fixes within a boot path are applied to one or more firmware modules, the information handling system may reboot to implement the updated to the firmware. Thus, the information handling system may update one or more firmware modules individually, rather than overwriting entire firmware volumes, to reduce system downtime required for application of firmware update.

The flow chart diagrams of FIGS. 7-11 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for managing firmware of an information handling system, comprising:
    receiving, by the information handling system, an update for a firmware of the information handling system;
    determining, by the information handling system based at least in part on the received update, one or more firmware modules of the information handling system that are changed by the update;
    determining, by the information handling system, a location of each of the one or more firmware modules within one or more firmware volumes of the information handling system using an offset list including one or more offsets corresponding to the one or more firmware modules; and
    updating the one or more firmware modules based, at least in part, on the determined location of each of the one or more firmware modules within the one or more firmware volumes.

2. The method of claim 1, wherein determining, by the information handling system, one or more firmware modules of the information handling system that are changed by the update comprises:
    comparing contents of the received update with current contents of the firmware of the information handling system; and
    determining, based on the comparison, one or more firmware modules of the firmware having current contents that differ from corresponding contents of the received update.

3. The method of claim 1, wherein determining the location of each of the one or more firmware modules comprises:
    determining, based on the offset list including one or more offsets corresponding to the one or more firmware modules, an offset within a flash memory of the information handling system at which a first firmware module of the one or more firmware modules is stored.

4. The method of claim 3, further comprising:
    determining that sufficient space remains in a portion of the flash memory allocated to the first firmware module for storage of the first firmware module when the update is applied,
    wherein updating the one or more firmware modules comprises overwriting, in the portion of the flash memory allocated to the first firmware module, one or more words of the first firmware module.

5. The method of claim 1, further comprising:
    generating, based on the determined one or more firmware modules and the received update, a modular firmware update package,
    wherein the modular firmware package comprises an updated firmware volume signature for a firmware volume comprising one or more of the one or more firmware modules, and wherein updating the one or more firmware modules comprises applying the updated firmware volume signature.

6. The method of claim 5, wherein generating the modular firmware package comprises requesting the updated firmware volume signature from a remote signing server.

7. The method of claim 1, further comprising:
reserving space in a flash memory in which the firmware of the information handling system is stored for future updates to the one or more firmware modules;
mapping the flash memory to determine a location of each of the one or more firmware modules in the flash memory and an amount of the reserved space for each of the one or more firmware modules in the flash memory for future updates; and
storing the determined location of each of the one or more firmware modules and the amount of the reserved space for each of the one or more firmware modules in the offset list.

8. An information handling system, comprising:
a processor; and
a memory,
wherein the processor is configured to perform steps comprising:
receiving an update for a firmware of the information handling system;
determining, based at least in part on the received update, one or more firmware modules of the information handling system that are changed by the update;
determining a location of each of the one or more firmware modules within one or more firmware volumes of the information handling system using an offset list including one or more offsets corresponding to the one or more firmware modules; and
updating the one or more firmware modules based, at least in part, on the determined location of each of the one or more firmware modules within the one or more firmware volumes.

9. The information handling system of claim 8, wherein determining, by the information handling system, one or more firmware modules of the information handling system that are changed by the update comprises:
comparing contents of the received update with current contents of the firmware of the information handling system; and
determining, based on the comparison, one or more firmware modules of the firmware having current contents that differ from corresponding contents of the received update.

10. The information handling system of claim 8, wherein determining the location of each of the one or more firmware modules comprises:
determining, based on the offset list including one or more offsets corresponding to the one or more firmware modules, an offset within a flash memory of the information handling system at which a first firmware module of the one or more firmware modules is stored.

11. The information handling system of claim 8, wherein the processor is further configured to perform steps comprising:
determining that sufficient space remains in a portion of a flash memory allocated to a first firmware module for storage of the first firmware module when the update is applied,
wherein updating the one or more firmware modules comprises overwriting, in the portion of the flash memory allocated to the first firmware module, one or more words of the first firmware module.

12. The information handling system of claim 8, wherein the processor is further configured to perform steps comprising:
generating, based on the determined one or more firmware modules and the received update, a modular firmware update package,
wherein the modular firmware package comprises an updated firmware volume signature for a firmware volume comprising one or more of the one or more firmware modules, and
wherein updating the one or more firmware modules comprises applying the updated firmware volume signature.

13. The information handling system of claim 12, wherein generating the modular firmware package comprises requesting the updated firmware volume signature from a remote signing server.

14. The information handling system of claim 8, wherein the processor is further configured to perform steps comprising:
reserving space in a flash memory in which the firmware of the information handling system is stored for future updates to the one or more firmware modules;
mapping the flash memory to determine a location of each of the one or more firmware modules in the flash memory and an amount of the reserved space for each of the one or more firmware modules in the flash memory for future updates; and
storing the determined location of each of the one or more firmware modules and the amount of the reserved space for each of the one or more firmware modules in the offset list.

15. A computer program product, comprising:
a non-transitory computer readable medium, wherein the non-transitory computer readable medium comprises instructions for causing a processor to perform steps comprising:
receiving, by an information handling system, an update for a firmware of the information handling system;
determining, by the information handling system based at least in part on the received update, one or more firmware modules of the information handling system that are changed by the update;
determining, by the information handling system, a location of each of the one or more firmware modules within one or more firmware volumes of the information handling system using an offset list including one or more offsets corresponding to the one or more firmware modules; and
updating the one or more firmware modules based, at least in part, on the determined location of each of the one or more firmware modules within the one or more firmware volumes.

16. The computer program product of claim 15, wherein determining, by the information handling system, one or more firmware modules of the information handling system that are changed by the update comprises:
comparing contents of the received update with current contents of the firmware of the information handling system; and
determining, based on the comparison, one or more firmware modules of the firmware having current contents that differ from corresponding contents of the received update.

17. The computer program product of claim 15, wherein determining the location of each of the one or more firmware modules comprises:

determining, based on the offset list including one or more offsets corresponding to the one or more firmware modules, an offset within a flash memory of the information handling system at which a first firmware module of the one or more firmware modules is stored.

18. The computer program product of claim 17, wherein the non-transitory computer readable medium further comprises instructions for causing a processor to perform steps comprising:

determining that sufficient space remains in a portion of the flash memory allocated to the first firmware module for storage of the first firmware module when the update is applied, wherein updating the one or more firmware modules comprises overwriting, in the portion of the flash memory allocated to the first firmware module, one or more words of the first firmware module.

19. The computer program product of claim 15, wherein the non-transitory computer readable medium further comprises instructions for causing a processor to perform steps comprising:

generating, based on the determined one or more firmware modules and the received update, a modular firmware update package, wherein the modular firmware package comprises an updated firmware volume signature for a firmware volume comprising one or more of the one or more firmware modules, and wherein updating the one or more firmware modules comprises applying the updated firmware volume signature.

20. The computer program product of claim 19, wherein generating the modular firmware package comprises requesting the updated firmware volume signature from a remote signing server.

\* \* \* \* \*